(12) United States Patent
Yang

(10) Patent No.: US 9,603,150 B2
(45) Date of Patent: Mar. 21, 2017

(54) RESOURCE ALLOCATION METHOD AND DEVICE

(75) Inventor: Yi Yang, Beijing (CN)

(73) Assignee: DATANG MOBILE COMMUNICATIONS EQUIPMENT CO., LTD, Beijing (CN)

( * ) Notice: Subject to any disclaimer, the term of this patent is extended or adjusted under 35 U.S.C. 154(b) by 172 days.

(21) Appl. No.: 13/982,141

(22) PCT Filed: Jan. 19, 2012

(86) PCT No.: PCT/CN2012/070614
§ 371 (c)(1),
(2), (4) Date: Jul. 30, 2013

(87) PCT Pub. No.: WO2012/100718
PCT Pub. Date: Aug. 2, 2012

(65) Prior Publication Data
US 2013/0329628 A1    Dec. 12, 2013

(30) Foreign Application Priority Data
Jan. 30, 2011 (CN) .......................... 2011 1 0032866

(51) Int. Cl.
*H04W 72/04* (2009.01)
*H04W 36/00* (2009.01)
*H04W 84/04* (2009.01)

(52) U.S. Cl.
CPC ..... *H04W 72/048* (2013.01); *H04W 36/0072* (2013.01); *H04W 72/0486* (2013.01); *H04W 84/045* (2013.01)

(58) Field of Classification Search
None
See application file for complete search history.

(56) References Cited

U.S. PATENT DOCUMENTS 8,594,011 B2 * 11/2013 Wang et al. .................. 370/315
2011/0194482 A1 * 8/2011 Ji et al. ......................... 370/315
(Continued)

FOREIGN PATENT DOCUMENTS

| CN | 102076041 A | 5/2011 |
|---|---|---|
| CN | 102088740 A | 6/2011 |
| WO | 2011019972 A1 | 2/2011 |

OTHER PUBLICATIONS

International Search Report of PCT/CN2012/070614, mailed Apr. 19, 2012.

*Primary Examiner* — Hassan Kizou
*Assistant Examiner* — Hashim Bhatti
(74) *Attorney, Agent, or Firm* — Oliff PLC

(57) ABSTRACT

Disclosed are a resource allocation method and device. By use of the technical solution provided in the embodiments of the present invention, when a home cell handover of a relay node occurs, the destination DeNB allocates through information exchange between itself and a source DeNB, and according to corresponding frequency information, a corresponding backhaul link resource to the relay node, this allows completion of sub-frame configuration of the backhaul link during the handover process, thereby reducing the influence on normal services of the relay node, ensuring service continuity for users accessing a network through the relay node, and reducing the number of lost packets during a transmission process, thus providing a better network experience to users.

20 Claims, 8 Drawing Sheets

(56) References Cited

U.S. PATENT DOCUMENTS

2011/0249642 A1* 10/2011 Song et al. .................. 370/329
2011/0292843 A1* 12/2011 Gan et al. .................... 370/277
2013/0308522 A1   11/2013 Yang et al.
2013/0329628 A1   12/2013 Yang

* cited by examiner

RESOURCE ALLOCATION METHOD AND DEVICE

CROSS REFERENCE TO RELATED APPLICATIONS

This application is the National Stage of PCT/CN2012/070614 filed on 19 Jan. 2012 which claims priority under 35 U.S.C. §119 of Chinese Application No CN201110032866.7 filed on 30 Jan. 2011, the disclosures of which are incorporated by reference. The international application under PCT article 21(2) was not published in English.

FIELD OF THE PRESENT INVENTION

The present invention relates to the field of communication technology, in particular to a resource allocation method and device.

BACKGROUND OF THE PRESENT INVENTION

In future mobile communication system, for example, Beyond Third Generation (B3G) system or in LTE-A (Long Term Evolution Advanced) system, the system will provide higher peak data rate and cell throughput, and need larger bandwidth at the same time.

At present, unallocated bandwidth with frequency less than 2 GHz has been very little, and the partial or the whole bandwidth required by B3 G can only be found in the higher frequency band (such as the frequency band with frequency higher than 3 GHz). In actual application, the higher the frequency band is, the faster the radio wave propagation attenuation will be and the shorter the transmission distance will be. Therefore, in the same coverage area, more base stations are needed to ensure the continuous coverage. However, since the cost of base station is high, this will undoubtedly increase the cost of network layout. In order to solve the problems concerning network layout cost and coverage, various manufacturers and standard organizations begin the research on introducing relay node (RN) into cellular system so as to increase network coverage.

FIG. 1 is the diagram of the network architecture of existing LTE-A system after RN is introduced therein. RN accesses core network through donor cell under the DeNB (Donor evolved Node B), but there is no direct wired interface between RN and core network. Each RN can control one or more cells. Under such architecture, the interface between UE (User Equipment) and RN is Uu interface, while that between RN and DeNB is Un interface.

Backhaul link refers to the link between access network and core network. Un interface is a part of the backhaul link, and is a kind of wireless backhaul link. In order to avoid interference, DeNB and RN shall discuss with RN on which sub-frames data shall be sent and received. For example, when DeNB sends downlink data to RN on some sub-frames, RN cannot send downlink data to UE on the same sub-frames, or it will cause inner equipment co-frequency interference of RN. When it is determined that sub-frame shall be divided between DeNB and RN, DeNB shall be responsible for completing sub-frame configuration and sending the allocated backhaul sub-frame configuration information to RN through RN reconfiguration process.

Establishing process of X2 is used for configuration data of application layer on interactive X2 interface between the two eNBs to make the two eNBs intercommunicate normally through X2 interface. When establishing the X2 interface, the configuration data of interactive application layer required between the two sides include ECGI (E-UTRAN Cell Global Identifier, evolved universal terrestrial radio access network cell global identifier) of the cell, PCI (Physical Cell Identifier), downlink frequency, etc. FIG. 2 shows the flow diagram of X2 interface establishing process in the prior art.

Similarly, in FIG. 1, X2 interface is established between eNB (evolved Node B) and DeNB, and between DeNB and RN, thus realizing the communication between base stations (DeNB has eNB property itself, while with respect to the self-service terminal equipment, RN also has the functions of eNB).

When the application layer configuration data of X2 interface of eNB change, eNB will notify adjacent eNB through eNB configuration and update process to make the two eNBs operate normally on X2 interface. Wherein, the application layer configuration data that may be updated include ECGI, PCI, downlink frequency, etc. FIG. 3 is the flow diagram of eNB configuration update process in the prior art.

X2 handover includes three stages: handover preparation, handover execution and route switch (also referred to as handover completion), as shown in FIG. 4, which is the flow diagram of X2 handover process in the prior art Handover preparation is initiated by source eNB to determine which target eNB shall be handed over to. Handover command message generated by carrying target eNB in handover request acknowledgement message is sent to UE by source eNB.

In the application scene with RN, after receiving handover request message, DeNB reads the target cell identifier therein, and then forwards the handover request to corresponding target base station.

In the prior art, when selecting donor cell, RN will select a proper cell to access according to the frequency of Uu interface itself and that of donor cell, and judge if DeNB is required for allocating special sub-frames used on backhaul for itself. Then RN will notify the judgment result to DeNB in RRC (Radio Resource Control) message.

In the process of realizing the present invention, at least the following problems are found in the prior art by the inventor:

When handover occurs due to RN moving, the donor cell accessed by RN changes, and the frequency used by target donor may be different from that used by original donor cell. Therefore, working state of RN may change. For example, "resource partitioning is required" mode is changed to "resource partitioning is not required" mode, or vice versa. However, how to configure backhaul sub-frame information is not described in the prior art under the condition that the attributive donor cell of RN is changed.

SUMMARY OF THE PRESENT INVENTION

The embodiments of the present invention provide a resource allocation method and device, which can solve the problem that there is no clear backhaul sub-frame information configuration program when RN changes a donor cell.

For achieving the above purpose, on the one hand, the embodiments of the present invention provide a resource allocation method, which comprises:

When the relay node under the first DeNB needs to be handed over to the second donor station, the second DeNB receives the handover request sent by the first DeNB, and the handover request carries the frequency information used for the relay node;

The second DeNB judges, according to the frequency information, whether it is necessary to allocate corresponding backhaul link resource for the relay node;

If the judgment result is yes, the second DeNB allocates corresponding backhaul link resource for the relay node;

The second DeNB configures the backhaul link resource information allocated for the relay node to the relay node.

On the other hand, the embodiments of the present invention provide a base station, which comprises:

Receiving module, which is used to receive the handover request sent by the first DeNB when the relay node under the first DeNB needs to be handed over to the base station, and the handover request carries the frequency information used for the relay node;

Judging module, which is used to judge, according to the frequency information carried in the request information and received by the receiving module, whether it is necessary to allocate corresponding backhaul link resource for the relay node;

Allocating module, which is used to allocate the corresponding backhaul link resource for the relay node when the judgment result of the judging module is yes;

Sending module, which is used to configure the backhaul link resource information allocated for the relay node to the relay node.

Furthermore, the embodiments of the present invention provide a resource allocation method, which comprises:

When the relay node under the first DeNB needs to be handed over to the second donor station, the relay node receives the backhaul link resource information allocated by the second DeNB for the relay node;

The relay node configures corresponding resource using the backhaul link resource information, and establishes corresponding service connection with the second DeNB. Moreover, the embodiments of the present invention provide a relay node, which comprises:

Receiving module, which is used to receive the handover command returned by the first DeNB, and the handover command carries the backhaul link resource information allocated for the relay node by the second DeNB;

Processing module, which is used to configure corresponding resource according to the backhaul link resource information received by the receiving module, and establish corresponding service connection with the second donor station.

Compared with the prior art, the technical solution provided in the embodiments of the present invention at least has the following advantages:

By use of the technical solution provided in the embodiments of the present invention, when a donor cell handover of a relay node occurs, the target DeNB allocates through information exchange between itself and a source DeNB, and according to corresponding frequency information, a corresponding backhaul link resource to the relay node, this allows completion of sub-frame configuration of the backhaul link during the handover process, thereby reducing the influence on normal services of the relay node, ensuring service continuity for users accessing a network through the relay node, and reducing the number of lost packets during a transmission process, thus providing a better network experience to users.

DETAILED DESCRIPTION OF THE EMBODIMENTS OF THE PRESENT INVENTION

As described in the background of the present invention, the purpose of introducing relay node (RN) in LTE-A system is to increase network coverage. RN connects DeNB in a wireless mode. The wireless interface between them is called Un interface. However, there is a lack of configuration program of corresponding backhaul link resource in the process of donor cell handover of RN.

Based on the above issues, the embodiments of the present invention put forward a method for configuration of backhaul resource in relay scene when DeNB handover occurs due to change of Relay position.

The technical solution put forward in the embodiments of the present invention is to use the existing handover process, through necessary information exchange between target DeNB and source DeNB, to complete the configuration of backhaul sub-frame between RN and target DeNB during the handover process, thereby reducing the influence on RN service of the handover, ensuring service continuity for users as far as possible, and reducing the number of lost packets.

Figure 1:
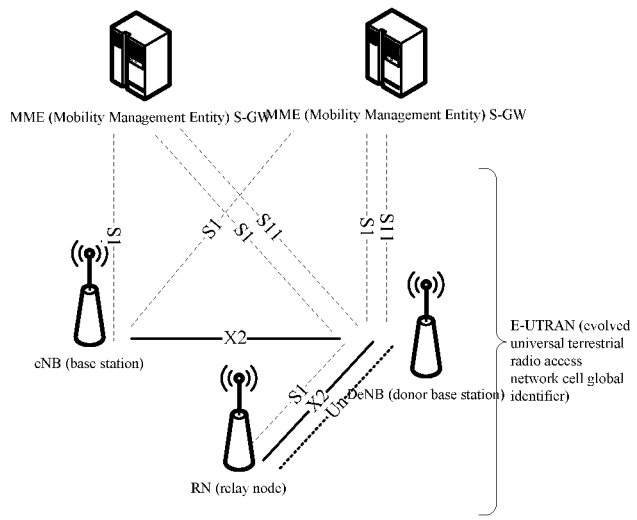
FIG. 1 is the diagram of network architecture of the existing LTE-A system after RN is introduced therein.
Figure 2:
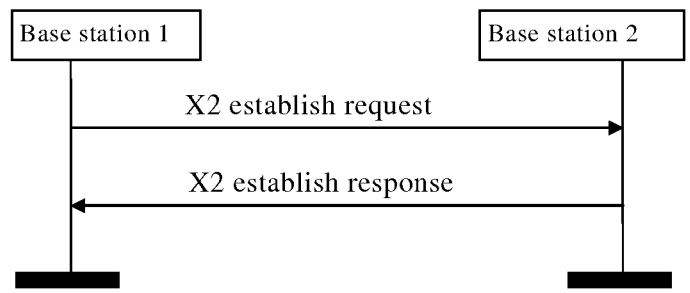
FIG. 2 is the flow diagram of the establishing process of X2 interface in the prior art.
Figure 3:
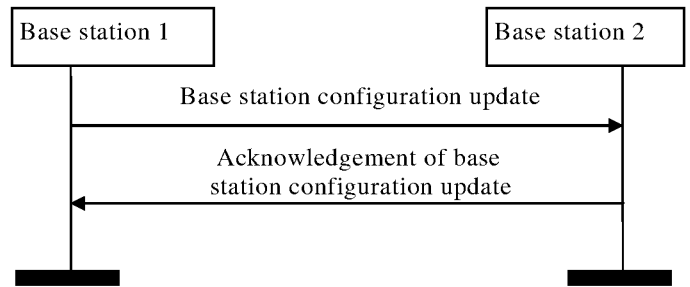
FIG. 3 is the flow diagram of the configuration update process of eNB in the prior art.
Figure 4:
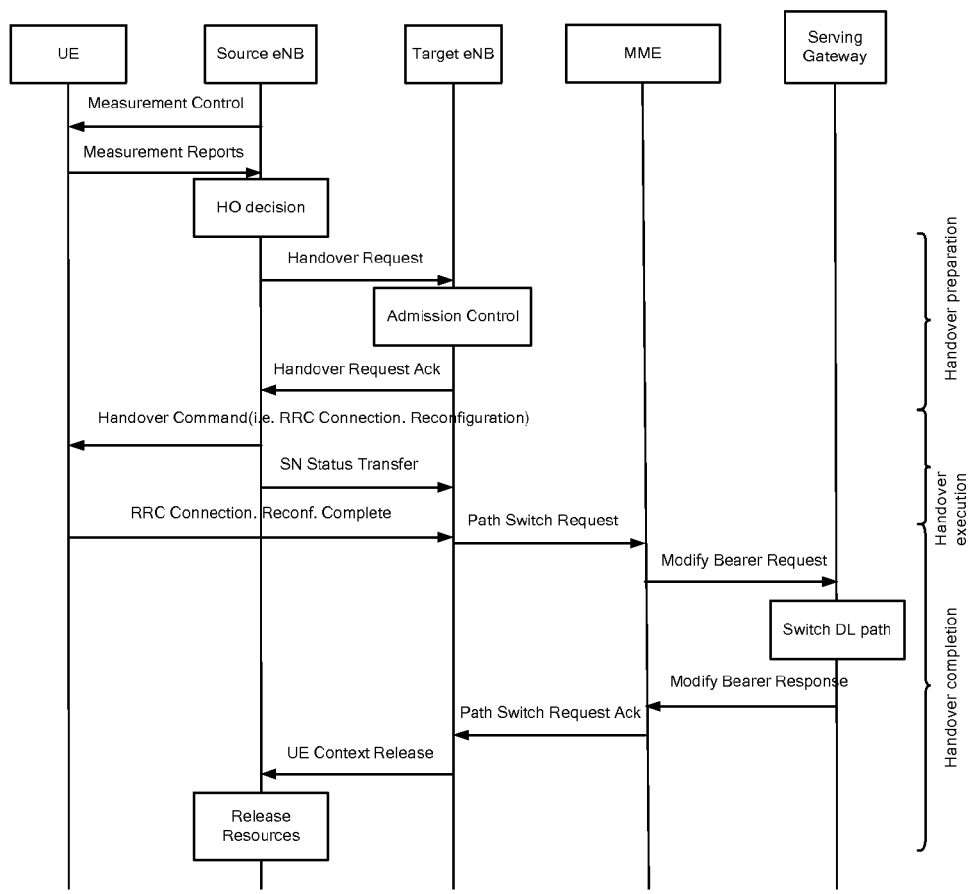
FIG. 4 is the flow diagram of X2 handover process in the prior art.
Figure 5:
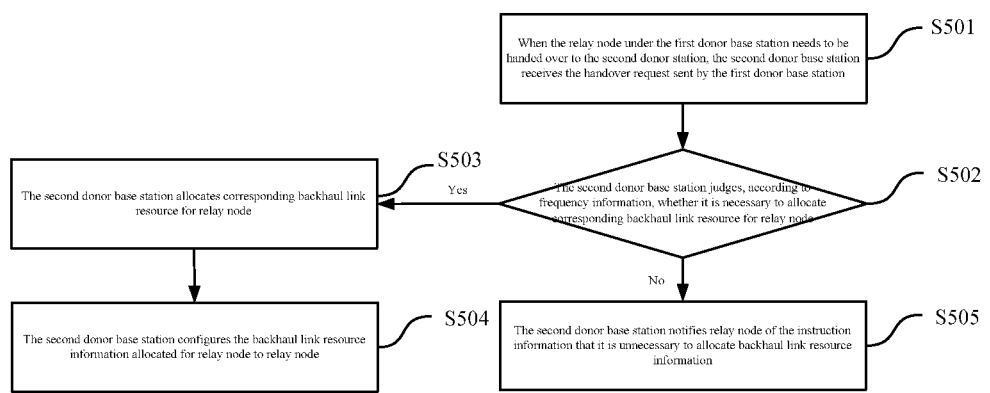
FIG. 5 is the flow diagram of a resource allocation method in the embodiments of the present invention.

FIG. 5 is the flow diagram of a resource allocation method put forward by the embodiments of the present invention, which comprises the following steps:

Step S501, when the relay node under the first DeNB needs to be handed over to the second donor station, the second DeNB receives the handover request sent by the first DeNB.

Wherein, handover request carries the frequency information used for relay node.

In the specific application scene, there are two methods specifically as below for receiving the aforementioned handover request:

Method I, the second DeNB receives the handover request directly sent by the first DeNB.

Method II, the second DeNB receives the handover request sent by the MME (Mobility Management Entity) to which the first DeNB belongs.

The difference between the aforementioned two methods is whether to perform corresponding information exchange through MME. Such method selection can be adjusted according to the actual requirement, and the selection of the specific method for sending and receiving the corresponding request will not influence the protection scope of the present invention.

At the same time, if one of the above methods is selected for receiving handover request, then the information exchanging method in subsequent processing will also be determined, which will be described in detail in the following steps.

It should be noted that, the frequency information used for relay node and carried in the aforementioned handover request is specifically the frequency information of Uu interface of relay node, which can be acquired through the following method:

The first DeNB can acquire it through the establishing process of X2 interface with relay node; or, The first DeNB can acquire it through the configuration update process of base station with relay node; or, The first DeNB can acquire it through RRC signaling with relay node.

Which method will be selected for acquiring the aforementioned frequency information will not influence the protection scope of the present invention.

On the other hand, in order to provide reference for determination of backhaul link resource information of the second DeNB, the following information can be carried in the handover request in this step:

If relay is subject to backhaul link sub-frame limit when it belongs to the first DeNB, the handover request sent by the first DeNB and received by the second DeNB also includes backhaul sub-frame configuration information of the relay node.

Step S502, the second DeNB judges, according to frequency information, whether it is necessary to allocate corresponding backhaul link resource for relay node.

If the judgment result is yes, step S503 will be executed;
If the judgment result is no, step S505 will be executed.

In actual application, the detailed treatment process of this step is that the second DeNB judges whether it is necessary to allocate corresponding backhaul link resource for relay node according to the frequency information used for relay node and that of the target cell to which the relay node needs to be handed over.

Step S503, the second DeNB allocates corresponding backhaul link resource for relay node, comprising:

The second DeNB allocates backhaul link resource for relay node according to the backhaul link resource information allocated for relay node by the first DeNB and the corresponding preset rules.

Wherein, the backhaul link resource allocated for relay node by the first DeNB can be acquired through the following methods:

The second DeNB acquires, through the received handover request sent by the first DeNB, the backhaul link resource information allocated for relay node by the first DeNB; or, The second DeNB acquires, through the received information sent by relay node, the backhaul link resource information allocated for relay node by the first DeNB. In actual application, such information exchange can be realized though the handover completion information after the completion of the handover of relay node in donor cell.

The specific acquiring method can be adjusted according to actual requirement, and changes of such acquiring method will not influence the protection scope of the present invention.

Step S504, the second DeNB configures the backhaul link resource information allocated for relay node to relay node.

Wherein, there are two methods as below for configuring the allocated backhaul link resource information:

Method A, complete configuration.

The second DeNB configures the complete information of backhaul link resource allocated for relay node to relay node.

Method B, increment configuration.

The second DeNB configures the change information, which is acquired by comparing the backhaul link resource information allocated for relay node with that allocated by the first DeNB for relay node, to relay node.

Step S505, the second DeNB notifies relay node of the indication information that indicates it is unnecessary to allocate backhaul link resource information.

In the aforementioned step S504 and step S505, there are two methods as below for configuring corresponding configuration information to relay node:

Configuration method I, configure directly to relay node.

After the completion of donor cell handover of relay node, the second DeNB configures the backhaul link resource information allocated for relay node to relay node through a reconfiguration process or notifies relay node of the indication information that indicates it is unnecessary to allocate backhaul link resource information.

Configuration method II, forward the configuration information through a DeNB.

The second DeNB carries the backhaul link resource information allocated for relay node in handover command and returns the information to the first DeNB, and the first DeNB configures the backhaul link resource information to relay node.

Which configuration method will be adopted will not influence the protection scope of the present invention.

It should be further noted that when configuration II is adopted, for the difference of the methods for receiving handover request in corresponding step S501, there are two kinds of return processes as below for corresponding information in step S504 and Step S505:

Method I, it corresponds to method I in step S501, which is to communicate with the first DeNB directly.

The second DeNB carries the backhaul link resource information allocated for relay node (corresponding to step S504), or the indication information (corresponding to step S505) that it is unnecessary to allocate backhaul link resource, in handover command, and returns them to the first DeNB directly.

Methods II, it corresponds to method II in step S501, which is to forward corresponding communication information to the first DeNB through corresponding MME.

The second DeNB carries the backhaul link resource information allocated for relay node, or the indication information that indicates it is unnecessary to allocate backhaul link resource, in handover command, and sends them to the MME to which the second DeNB belongs;

The MME to which the second DeNB belongs forwards the handover command to the MME to which the first DeNB belongs;

The MME to which the first DeNB belongs forwards the handover command to the first DeNB.

Compared with the prior art, the technical solution put forward by the embodiments of the present invention at least has the following advantages:

By use of the technical solution provided in the embodiments of the present invention, when a donor cell handover of a relay node occurs, the target DeNB allocates through information exchange between itself and a source DeNB, and according to corresponding frequency information, a corresponding backhaul link resource to the relay node, this allows completion of sub-frame configuration of the backhaul link during the handover process, thereby reducing the influence on normal services of the relay node, ensuring service continuity for users accessing a network through the relay node, and reducing the number of lost packets during a transmission process, thus providing a better network experience to users.

According to the technical ideas of the technical solution put forward by the embodiments of the present invention, when a donor cell handover of a RN occurs, the target DeNB determines whether it is necessary to allocate resource for this RN, and the detailed processing ideas are as follows.

Source DeNB sends the frequency information of Uu interface of RN to target DeNB, and the target DeNB judges whether it is necessary to allocate special sub-frame used for Uu interface to RN according to the frequency information of RN Uu interface and that of target cell. If it is necessary, target DeNB allocates corresponding sub-frame for RN, and sends the new sub-frame configuration to RN in handover command, or sends the new sub-frame configuration to RN through RN reconfiguration process after completion of the handover.

The technical solution put forward by the embodiments of the present invention is explained in a detailed way with reference to the specific application scene in the present invention.

Implementation Scene I

Figure 6:
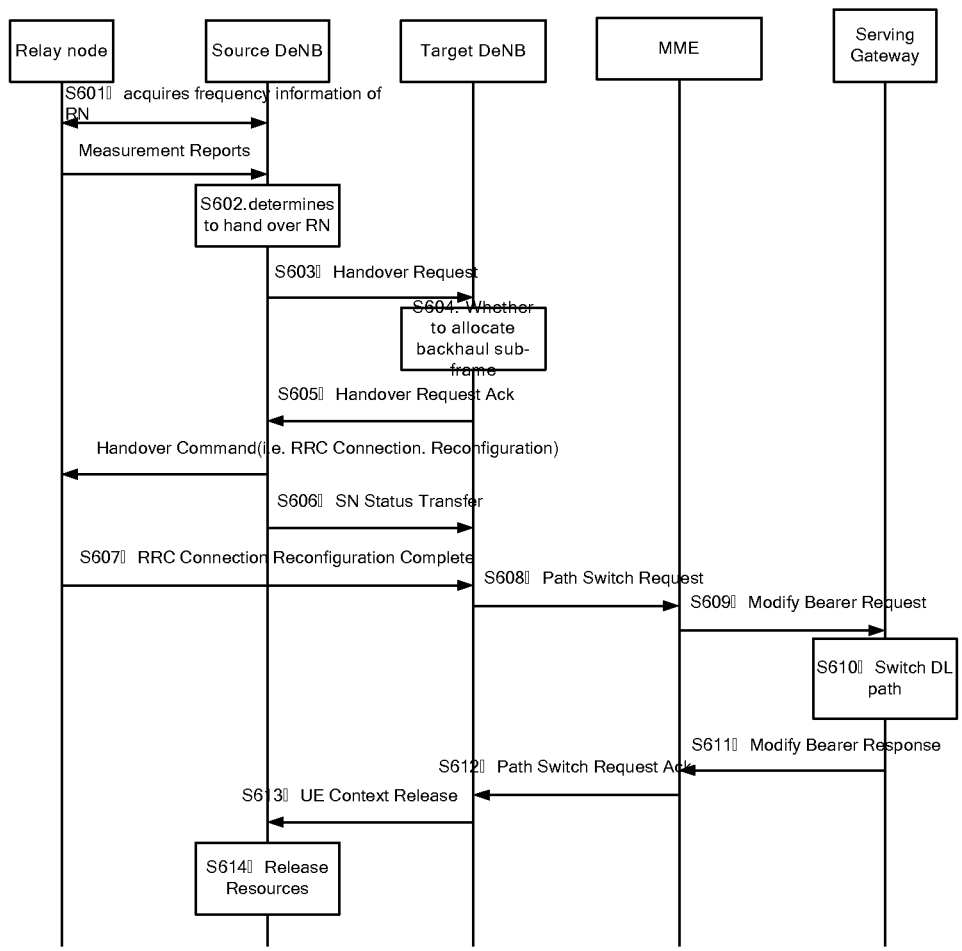
FIG. 6 is the flow diagram of a resource allocation method in implementation scene I put forward by the embodiments of the present invention.

FIG. 6 is the flow diagram of a resource allocation method in implementation scene I put forward by the embodiments of the present invention, which comprises the following steps in detail:

Step S601, source DeNB acquires frequency information of RN.

Before the handover, if RN has established X2 interface with source DeNB, or the eNB configuration update process has been carried out between RN and source DeNB, or RRC process has been carried out between RN and source DeNB, source DeNB can acquire the frequency used for Uu interface of RN.

Step S602, source DeNB determines to hand over RN.

Step S603, source DeNB sends handover request to target DeNB.

When source DeNB sends handover request to target DeNB, it sends the frequency information of Uu interface of RN to the target DeNB.

If RN has backhaul sub-frame limit in source DeNB, source DeNB can send the sub-frame configuration information of RN to target DeNB in handover request message, such as putting the sub-frame configuration information in handover preparation information.

Certainly, the aforementioned sub-frame configuration information of RN may not be carried, but through other processes, or the aforementioned sub-frame configuration information of RN are not fed back to target DeNB, and such changes will not influence the protection scope of the present invention.

Step S604, after receiving the handover request, target DeNB determines whether to allocate backhaul sub-frame for RN according to information like the selected frequency of target cell, Uu interface frequency of RN, etc.

If target cell and RN have different Uu interface bands, it will be unnecessary to allocate backhaul sub-frame for RN. Otherwise, it is necessary to allocate backhaul sub-frame for RN.

Step S605, target DeNB sends handover command to RN through source DeNB, namely, RRC connection reconfiguration message.

If the target DeNB allocates backhaul sub-frame for RN, these backhaul sub-frame configuration information can be put in RRC connection reconfiguration message and sent to RN.

If target DeNB receives the original sub-frame configuration information of RN in handover request message, it can refer to the sub-frame configuration information of RN for determination of the new sub-frame configuration; for example, it can adopt the same sub-frame configuration and send it to RN.

When target DeNB allocates sub-frame configuration for RN, it can send the complete sub-frame configuration information to RN, and it also can send only the changed information to RN, viz. increment configuration. If the increment configuration is adopted, when target DeNB determines that resource partitioning is unnecessary, DeNB needs to give an instruction to RN, or RN will mistake that sub-frame configuration information does not change.

When the complete configuration method is adopted in step S605, if the RRC connection reconfiguration message received by RN includes backhaul sub-frame configuration information, the new sub-frame configuration information will be used. Otherwise, RN will not be limited by sub-frame at Un interface.

When the increment configuration method is adopted in step S605, if the RRC connection reconfiguration message received by RN includes backhaul sub-frame configuration information, the existing sub-frame configuration information will be updated. If DeNB instructs that resource partitioning is unnecessary, RN will not be limited by sub-frame at Un interface.

Processing flows of step S606 to step S614 are existing process programs, hereby, they will not be described again.

Implementation Scene II

Figure 7:
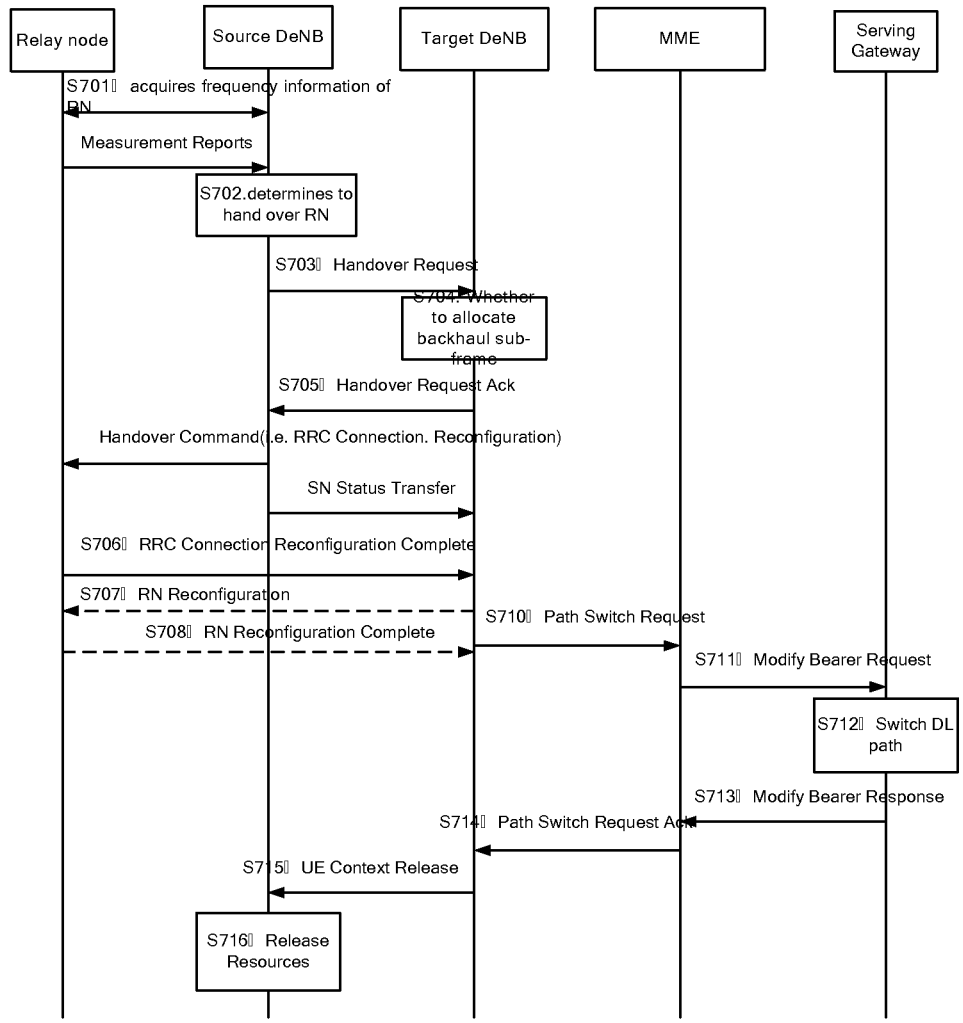
FIG. 7 is the flow diagram of a resource allocation method in implementation scene II put forward by the embodiments of the present invention.

FIG. 7 is the flow diagram of a resource allocation method in implementation scene II put forward by the embodiments of the present invention, which comprises the following steps in detail:

Step S701 to step S704 are similar to Step S601 to step S604 in implementation scene I, hereby they will not be described again.

Step S705, target DeNB sends handover command to RN through source DeNB, namely, RRC connection reconfiguration message.

Step S706, after receiving RRC connection reconfiguration message, RN is handed over to the cell under target DeNB, and returns the message of RRC connection reconfiguration completion to target DeNB.

In actual application scene, before this step, RN also can send corresponding sub-frame configuration information to target DeNB in the RRC connection reconfiguration completion message in this step.

Changes of the feedback time of the specific sub-frame configuration information will not influence the protection scope of the present invention.

In step S704, if target DeNB determines to allocate backhaul sub-frame for RN, step S707 will be executed.

Step S707, after RN accesses target DeNB, target DeNB initiates reconfiguration process of RN, puts new sub-frame configuration information in the RN reconfiguration message and sends them to RN.

If target DeNB receives the original sub-frame configuration information of RN in handover request message or in RRC connection reconfiguration completion message, it can refer to the sub-frame configuration information of RN for determination of the new sub-frame configuration. For example, it can adopt the same sub-frame configuration and send it to RN.

When target DeNB allocate sub-frame configuration for RN, it can send the complete sub-frame configuration information to RN, and it also can send only the changed configuration information to RN, viz. increment configuration. If increment configuration is adopted, when target DeNB determines that resource partitioning is unnecessary, target DeNB needs to give an instruction to RN, or RN will mistake that sub-frame configuration information does not change.

Step S708, after receiving RN reconfiguration message, RN applies the new sub-frame configuration information, and returns the message of RN reconfiguration completion to target DeNB.

Processing flows of step S709 to step S714 are existing process programs, hereby, they will not be described again.

It should be noted that, there is no strict chronological order for RN reconfiguration process in the aforementioned step S707 and step S708 and for the processing of step S709. Such changes of the order will not influence the prevention scope of the present invention.

Compared with implementation scene I, in the technical solution of implementation scene II, when RN returns the message of RRC connection reconfiguration completion to target DeNB (viz. step S706), since target DeNB does not configure new backhaul sub-frame information for RN, RN may not be subject to the limit of backhaul sub-frame.

Implementation Scene III

Figure 8:
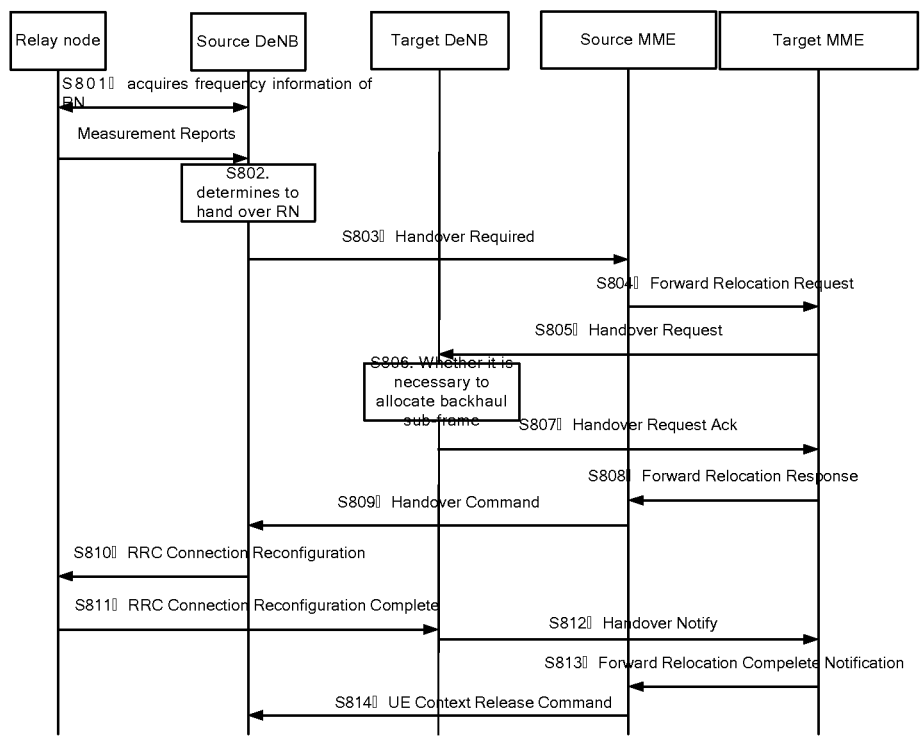
FIG. 8 is the flow diagram of a resource allocation method in implementation scene III put forward by the embodiments of the present invention.

FIG. 8 is the flow diagram of a resource allocation method in implementation scene III put forward by the embodiments of the present invention, which comprises the following steps in detail:

Step S801, source DeNB acquires frequency information of RN.

Before the handover, if RN has established X2 interface with source DeNB, or the eNB configuration update process has been carried out between RN and source DeNB, or RRC process has been carried out between RN and source DeNB, source DeNB can acquire the frequency used for Uu interface of RN.

Step S802, source DeNB determines to hand over RN.

Step S803, source DeNB sends handover request to source MME.

Wherein, the frequency information of Uu interface of RN is carried in handover request.

The frequency information of Uu interface of RN can be put in Source To Target Transparent Container IE.

If RN has backhaul sub-frame limit in source DeNB, source DeNB can send the sub-frame configuration information of RN to target DeNB in handover request message, for example, putting it in Source To Target Transparent Container IE.

Certainly, the aforementioned sub-frame configuration information of RN may not be carried, but through other processes, or the aforementioned sub-frame configuration information of RN are not fed back to target DeNB, and such changes will not influence the protection scope of the present invention.

Step S804, source MME finds target MME, and sends forward relocation request message.

Step S805, target MME determines target DeNB, and sends handover request message to the target DeNB.

Step S806, after receiving the handover request, the target DeNB determines whether to allocate backhaul sub-frame for RN according to information like the selected frequency of target cell, Uu interface frequency of RN, etc.

If target cell and RN have different Uu interface bands, it will be unnecessary to allocate backhaul sub-frame for RN. Otherwise, it is necessary to allocate backhaul sub-frame for RN.

Step S807 to step S809 are the processes in which target DeNB forwards the handover command to source DeNB through target MME and source MME. The used signaling is existing signaling, hereby, it will not be described again.

Wherein, if it is determined in step S806 that it is necessary to allocate backhaul sub-frame for RN, target DeNB will allocate backhaul sub-frame for RN, and put these backhaul sub-frame configuration information in the information forwarded from step S807 to step S809 and send them to source DeNB, and finally source DeNB will carry these backhaul sub-frame configuration information in RRC connection reconfiguration message and send them to RN (and step S810).

Processing flows of step S811 to step S814 are existing process programs, hereby, they will not be described again.

Implementation Scene V

Figure 9:
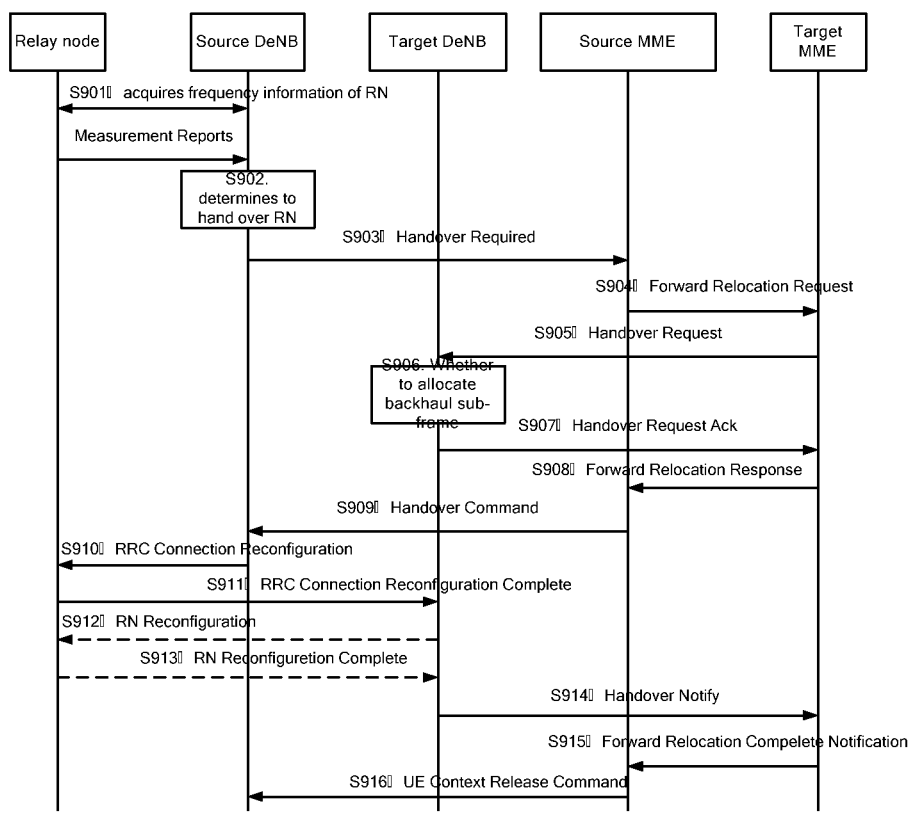
FIG. 9 is the flow diagram of a resource allocation method in implementation scene IV put forward by the embodiments of the present invention.

FIG. 9 is the flow diagram of a resource allocation method in implementation scene IV put forward by the embodiments of the present invention, which comprises the following steps in detail:

Step S901 to step S906 are similar to Step S801 to step S806 in implementation scene III, hereby, they will not be described again.

Step S907 to step S909 are the processes in which target DeNB forwards the handover command to source DeNB through target MME and source MME. The used signaling is existing signaling, and backhaul sub-frame configuration information will not carried through these signaling. Hereby, the specific forwarding process will not be described again.

Step S910 and step S911 are the processes for completing RRC connection reconfiguration of RN, in which there is no transmission of backhaul sub-frame configuration information.

Similar to the aforementioned step S705, RN can report the original sub-frame configuration information to target DeNB in the message of RRC connection reconfiguration completion.

Step S912, after RN accesses target DeNB, target DeNB initiates reconfiguration process of RN, puts new sub-frame configuration information in the RN reconfiguration message and sends them to RN.

If target DeNB receives the original sub-frame configuration information of RN in handover request message or in RRC connection reconfiguration completion message, it can refer to the sub-frame configuration information of RN for determination of the new sub-frame configuration. For example, it can adopt the same sub-frame configuration and send it to RN.

When target DeNB allocate sub-frame configuration for RN, it can send the complete sub-frame configuration information to RN, and it also can send only the changed configuration information to RN, viz. increment configuration. If increment configuration is adopted, when target DeNB determines that resource partitioning is unnecessary, target DeNB needs to give an instruction to RN, or RN will mistake that sub-frame configuration information does not change.

Step S913, after receiving RN reconfiguration message, RN applies the new sub-frame configuration information, and returns the message of RN reconfiguration completion to target DeNB.

Processing flows of step S914 to step S916 are existing process programs. Hereby, they will not be described again.

Compared with implementation scene I, in the technical solution of implementation scene II, when RN returns the message of RRC connection reconfiguration completion to target DeNB (viz. step S913), since target DeNB does not configure new backhaul sub-frame information for RN, RN may not be subject to the limit of backhaul sub-frame.

Compared with the prior art, the technical solution put forward by the embodiments of the present invention at least has the following advantages:

By use of the technical solution provided in the embodiments of the present invention, when a donor cell handover of a relay node occurs, the target DeNB allocates through information exchange between itself and a source DeNB, and according to corresponding frequency information, a corresponding backhaul link resource to the relay node, this allows completion of sub-frame configuration of the backhaul link during the handover process, thereby reducing the influence on normal services of the relay node, ensuring service continuity for users accessing a network through the relay node, and reducing the number of lost packets during a transmission process, thus providing a better network experience to users.

In order to realize the aforementioned technical solution put forward by the embodiments of the present invention, the embodiments of the present invention also provide corresponding equipment.

Figure 10:
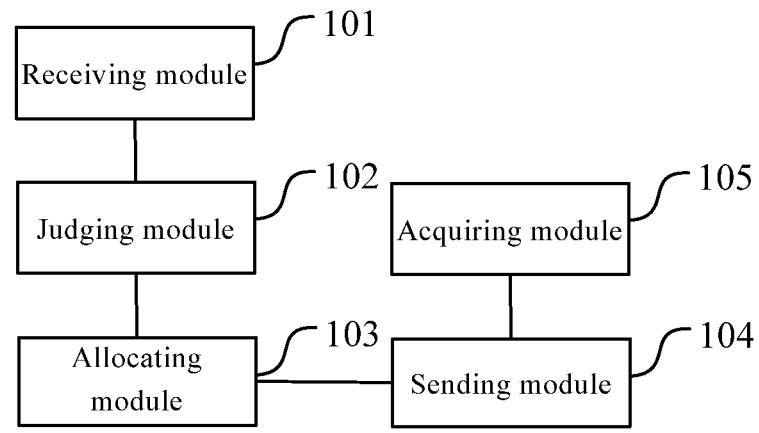
FIG. 10 is the structure diagram of a base station in the embodiments of the present invention.

First, the embodiments of the present invention provide a base station, of which the structure diagram is shown in FIG. 10, comprising:

Receiving module 101, which is used to receive the handover request sent by the first DeNB when the relay node under the first DeNB needs to be handed over to the base station, and the handover request carries the frequency information used for relay node;

Judging module 102, which is used to judge whether it is necessary to allocate corresponding backhaul link resource for relay node according to the frequency information carried in handover request received by the receiving module 101;

Allocating module 103, which is used to allocate corresponding backhaul link resource to relay node when the judgment result of the judging module 102 is yes;

Sending module 104, which is used to configure the backhaul link resource information allocated for relay node to relay node.

Wherein, receiving module 101, which is specifically used to:

Receive the handover request directly sent by the first DeNB; or,

Receive the handover request sent by the MME to which this base station belongs.

What's more, judging module 102, which is specifically used to judge whether it is necessary to allocate corresponding backhaul link resource for relay node according to the frequency information used for relay node and that of the target cell to which relay node needs to be handed over.

Under this condition, sending module 104 is also used to notify relay node of the indication information that indicates it is unnecessary to allocate backhaul link resource when the judgment result is no.

In the specific implementation scene, allocating module 103 is specifically used to allocate backhaul link resource for relay node according to the backhaul link resource information allocated for relay node by the first DeNB and the corresponding preset rules. Wherein, the backhaul link resource information allocated for relay node by the first DeNB is acquired specifically through the received handover request sent by the first DeNB or the information sent by relay node.

On the other hand, sending module 104, which is specifically used to:

Carry the backhaul link resource information allocated for relay node by allocating module 103 in handover command and return them to the first DeNB, and the backhaul link resource information will be configured to relay node by the first DeNB; or, Configure the backhaul link resource information, which is allocated for relay node by allocating module 103, to relay node through a reconfiguration process after the completion of donor cell handover of relay node.

Wherein, sending module 104, which is specifically used to:

Configure the complete information of the backhaul link resource allocated for relay node to relay node; or, Configure the change information, which is acquired by comparing the backhaul link resource allocated for relay node with that allocated by the first DeNB for relay node, to relay node.

In specific implementation scene, sending module 104, which is specifically used to:

When receiving handover request directly sent by the first DeNB, receiving module 101 carries the backhaul link resource information allocated for relay node, or the indication information that indicates it is unnecessary to allocate backhaul link resource, in handover command, and return them to the first DeNB directly; or, When receiving the handover request sent by the first DeNB and the MME to which the second DeNB belongs, receiving module 101 carries the backhaul link resource information allocated for relay node, or the indication information that indicates it is unnecessary to allocate backhaul link resource, in handover command, and forwards them to the first DeNB through the MME to which the base station belongs and the MME to which the second DeNB belongs.

What's more, this base station also comprises:

Acquiring module 105, which is used to acquire frequency information of relay node through establishing process of X2 interface with relay node served by the base station, or configuration update process of the base station, or RRC process;

Sending module 104, which is also used to send the frequency information of relay node acquired by acquiring module 105 to other DeNBs when the relay node served by the base station needs to be handed over to other DeNBs.

Figure 11:
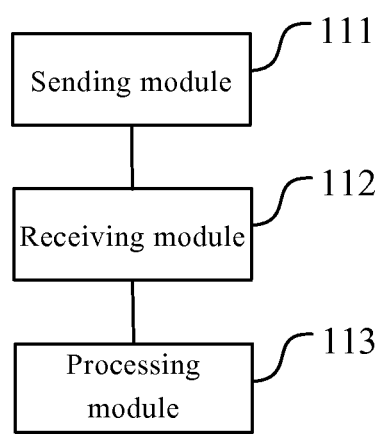
FIG. 11 is the structure diagram of a relay node in the embodiments of the present invention.

On the other hand, the embodiments of the present invention also provide a relay node, of which the structure diagram is shown in FIG. 11, comprising:

Receiving module 111, which is used to receive the handover command returned by the first DeNB, and the handover command carries the backhaul link resource information allocated for relay node by the second DeNB;

Processing module 112, which is used to configure corresponding resource according to the backhaul link resource information received by receiving module 111, and establish corresponding service connection with the second donor station.

In the specific implementation scene, receiving module 111 is specifically used to:

Receive the handover command which is returned by the first DeNB and carries the backhaul link resource information allocated for relay node by the second DeNB, and the handover command is forwarded to relay node by the second DeNB through the first DeNB; or, Acquire, through the reconfiguration process with the second DeNB after the completion of donor cell handover of relay node, the backhaul link resource information allocated for relay node by the second DeNB.

Wherein, this relay node also comprises sending module 113, which is used to send backhaul link resource information, which is configured by the first DeNB, to the second DeNB after the completion of donor cell handover of relay node, so as to make the second DeNB allocate new backhaul link resource information for relay node according to this backhaul link resource information.

Compared with the prior art, the technical solution put forward by the embodiments of the present invention at least has the following advantages:

By use of the technical solution provided in the embodiments of the present invention, when a donor cell handover of a relay node occurs, the target DeNB allocates through information exchange between itself and a source DeNB, and according to corresponding frequency information, a corresponding backhaul link resource to the relay node, this allows completion of sub-frame configuration of the backhaul link during the handover process, thereby reducing the influence on normal services of the relay node, ensuring service continuity for users accessing a network through the relay node, and reducing the number of lost packets during a transmission process, thus providing a better network experience to users.

Through the description of the embodiments above, the technical personnel in this field can understand clearly that the present invention can be implemented by hardware or software and necessary general hardware platform. Based on this understanding, the technical program of the present invention can be embodied by a form of software products which can be stored in a nonvolatile storage medium (such as CD-ROM, U disk, mobile hard disk, etc.), including a number of instructions for making a computer device (such as personal computers, servers, or network equipment, etc.) implement the methods described in the implement scenes of the present invention.

The technical personnel in this field can be understood that the illustration is only schematic drawings of a preferred implementation scene, and the module or process is not necessary for the implementation of the present invention.

The technical personnel in this field can be understood that the modules can be distributed in device of the implementation scenes according to the description of the implementation scenes above, and also can be varied in one or multiply device of the implementation scenes. The modules of the implementation scenes can be combined into a module, and also can be further split into several submodules.

The number of the present invention is only to describe, it does not represent the pros and cons of the implementation scenes.

The descriptions above are just preferred implementation scenes of the present invention. It should be pointed that, for general technical personnel in this field, some improvement and decorating can be done, which should be as the protection scope of the present invention.

The invention claimed is:
1. A resource allocation method, comprising:
when a relay node under a first Donor evolved Node B (DeNB) needs to be handed over to a second DeNB:
receiving, by the second DeNB, a handover request sent by the first DeNB, the handover request carrying frequency information used for the relay node;
judging, by the second DeNB, according to the frequency information, whether it is necessary to allocate a corresponding backhaul link resource to the relay node; and
if it is judged to be necessary to allocate the corresponding backhaul link resource to the relay node:
allocating, by the second DeNB, the corresponding backhaul link resource for the relay node; and
configuring, by the second DeNB, backhaul link resource information allocated for the relay node to the relay node.

2. The method according to claim 1, wherein the receiving, by the second DeNB, of the handover request sent by the first DeNB includes at least one of:
receiving, by a second base station, the handover request directly sent by the first DeNB; and
receiving, by the second base station, the handover request sent by a Mobility Management Entity (MME) to which the second base station belongs.

3. The method according to claim 1, wherein
the frequency information used for the relay node specifically refers to that of a Uu interface between the relay node and the first DeNB, which is acquired specifically through one of the following methods:
acquiring, by the first DeNB, through a process of establishing an X2 interface with the relay node;
acquiring, by the first DeNB, through a configuration update process of a base station with the relay node; and
acquiring, by the first DeNB, through Radio Resource Control (RRC) signaling with the relay node;
if the relay node is subject to a backhaul link sub-frame limit when it belongs to the first DeNB, the handover request sent by the first DeNB and received by the second DeNB also includes backhaul sub-frame configuration information of the relay node; and
the judging, by the second DeNB, according to the frequency information, whether it is necessary to allocate the corresponding backhaul link resource for the relay node, includes the second DeNB judging whether it is necessary to allocate the corresponding backhaul link resource to the relay node according to the frequency information used for the relay node and that of a target cell to which the relay node needs to be handed over to.

4. The method according to claim 1, further comprising:
after the second DeNB judges whether it is necessary to allocate the corresponding backhaul link resource to the relay node, if it is judged not to be necessary to allocate the corresponding backhaul link resource to the relay node:
notifying, by the second DeNB, the relay node of indication information that indicates it is unnecessary to allocate the corresponding backhaul link resource.

5. The method according to claim 4, wherein the second DeNB notifying the relay node of the indication information that indicates it is unnecessary to allocate the corresponding backhaul link resource, comprises at least one of:
sending, by the second DeNB, a handover command to the first DeNB, the handover command carrying the indication information that indicates it is unnecessary to allocate the backhaul link resource; and
notifying, by the second DeNB, the relay node of the indication information that indicates it is unnecessary to allocate backhaul link resource through a reconfiguration process after the completion of a donor cell handover of the relay node.

6. The method according to claim 1, wherein the allocation of the corresponding backhaul link resource for the relay node, by the second DeNB comprises: allocating, by the second DeNB, a backhaul link resource for the relay node according to the backhaul link resource information allocated for the relay node by the first DeNB and corresponding preset rules.

7. The method according to claim 6, wherein the acquiring of the backhaul link resource information allocated for the relay node by the first DeNB includes at least one of:
after receiving the handover request sent by the first DeNB, acquiring, by the second DeNB, the backhaul link resource information allocated for the relay node by the first DeNB; and
acquiring, by the second DeNB, through the received information sent by the relay node, the backhaul link resource information allocated for the relay node by the first DeNB.

8. The method according to claim 1, wherein the configuring by the second DeNB the backhaul link resource information allocated for the relay node to the relay node includes at least one of:
carrying, by the second DeNB, the backhaul link resource information allocated for the relay node in a handover command, returning the backhaul link resource information to the first DeNB, and configuring, by the first DeNB, the backhaul link resource information to the relay node; and
configuring, by the second DeNB, the backhaul link resource information allocated for the relay node to the relay node through a reconfiguration process after completion of a donor cell handover of the relay node.

9. The method according to claim 8, wherein the configuration by the second DeNB of the backhaul link resource information allocated for the relay node to the relay node includes at least one of:
configuring, by the second DeNB, complete information of the backhaul link resource information allocated for the relay node to the relay node; and
configuring, by the second DeNB, change information, which is acquired by comparing the backhaul link resource allocated for the relay node with that allocated by the first DeNB for the relay node, to the relay node.

10. The method according to claim 2, further comprising:
when the handover request sent directly by the first DeNB is received by the second DeNB, carrying, by the second DeNB, the backhaul link resource information allocated for the relay node, or the indication information that indicates it is unnecessary to allocate the backhaul link resource, in a handover command, and returning, by the second DeNB, them to the first DeNB, which includes at least one of:
carrying, by the second DeNB, the backhaul link resource information allocated for the relay node, or the indication information that indicates it is unnecessary to allocate backhaul link resource, in the handover command, and returning them to the first DeNB directly; and
when receiving the handover request sent by the MME to which the second DeNB belongs, carrying, by the second DeNB, the backhaul link resource information allocated for the relay node, or the indication information that indicates it is unnecessary to allocate backhaul link resource, in the handover command, and returning them, by the second DeNB, to the first DeNB, which includes the second DeNB carrying the backhaul link resource information allocated for the relay node, or the indication information that indicates it is unnecessary to allocate backhaul link resource, in the handover command, and sending them to the MME to which the second DeNB belongs, wherein
the MME to which the second DeNB belongs forwards the handover command to the MME to which the first DeNB belongs, and
the MME to which the first DeNB belongs forwards the handover command to the first DeNB.

11. A base station comprising:
a hardware processor programmed to:
receive a handover command sent by a first Donor evolved Node B (DeNB) when a relay node under the first DeNB needs to be handed over to the base station, the handover command carrying frequency information used for the relay node;
judge whether it is necessary to allocate a corresponding backhaul link resource for the relay node according to the frequency information carried in the received handover command; and
if it is judged to be necessary to allocate the corresponding backhaul link resource to the relay node:
allocate the corresponding backhaul link resource for the relay node; and
configure backhaul link resource information allocated for the relay node to the relay node.

12. The base station according to claim 11, wherein the hardware processor is further programmed to:
at least one of:
receive the handover request sent directly by the first DeNB; and
receive the handover request sent by the MME to which the base station belongs;
judge whether it is necessary to allocate the corresponding backhaul link resource for the relay node according to the frequency information used for the relay node and that of a target cell to which the relay node needs to be handed over; and
the relay node of indication information that indicates it is unnecessary to allocate the backhaul link resource when it is judged not to be necessary to allocate the corresponding backhaul link resource to the relay node.

13. The base station according to claim 11, wherein
the hardware processor is further programmed to: allocate the backhaul link resource for the relay node according to the backhaul link resource information allocated for the relay node by the first DeNB and corresponding preset rules; and
the backhaul link resource information allocated for the relay node by the first DeNB is acquired through the received handover request sent by the first DeNB or information sent by the relay node.

14. The base station according to claim 11, wherein the processor is further programmed to at least one of:
carry the backhaul link resource information allocated for the relay node in the handover command and return the backhaul link resource information to the first DeNB, the first DeNB configuring the backhaul link resource information to the relay node; and
configure the backhaul link resource information allocated for the relay node to the relay node through a reconfiguration process after completion of a donor cell handover of the relay node.

15. The base station according to claim 14, wherein the processor is further programmed to at least one of:
configure complete information of the backhaul link resource allocated for the relay node to the relay node; and
configure change information, which is acquired by comparing the backhaul link resource allocated for the relay node with that allocated by the first DeNB for the relay node, to the relay node.

16. The base station according to claim 12, wherein the processor is further programmed to at least one of:
when receiving the handover request sent directly by the first DeNB, carry the backhaul link resource information allocated for the relay node, or the indication information that indicates it is unnecessary to allocate the backhaul link resource, in a handover command, and return them to the first DeNB directly; and
when receiving the handover request sent by the MME to which the second DeNB belongs, carry the backhaul link resource information allocated for the relay node, or the indication information that indicates it is unnecessary to allocate backhaul link resource, in the handover command, and forward them to the first DeNB through the MME to which the base station belongs and the MME to which the first DeNB belongs.

17. The base station according to claim 11, wherein the processor is further programmed to:
acquire frequency information of the relay node through a process of establishing an X2 interface with a relay node served by the base station, a configuration update process of the base station, or Radio Resource Control (RRC) signaling; and
send the acquired frequency information of the relay node to other DeNBs when the relay node served by the base station needs to be handed over to other DeNBs.

18. A resource allocation method, comprising:
when a relay node under a first Donor evolved Node B (DeNB) needs to be handed over to a second DeNB:
receiving, by the relay node, the backhaul link resource information allocated for the relay node by the second DeNB;
configuring, by the relay node, a corresponding resource by use of the backhaul link resource information; and
establishing, by the relay node, a corresponding service connection with the second DeNB.

19. The method according to claim 18, wherein the receiving by the relay node of the backhaul link resource information allocated for the relay node by the second DeNB includes at least one of:
receiving, by the relay node, a handover command which is returned by the first DeNB and carries the backhaul link resource information allocated for the relay node by the second DeNB, and forwarding, by the second DeNB, the handover command to the relay node through the first DeNB; and
after completion of a donor cell handover of the relay node, acquiring, by the relay node, through a reconfiguration process with the second DeNB, the backhaul link resource information allocated for the relay node by the second DeNB.

20. The method according to claim 18, further comprising: before the relay node receives the backhaul link resource information allocated for the relay node by the second DeNB, after the completion of the donor cell handover of the relay node, sending, by the relay node, the backhaul link resource information configured by the first DeNB to the second DeNB, so as to make the second DeNB allocate new backhaul link resource information for the relay node according to the backhaul link resource information.

* * * * *